Aug. 27, 1968  E. R. ADAMS ET AL  3,399,092
PROCESS OF MAKING IMPREGNATED FILTER TUBES
Filed Dec. 17, 1964  2 Sheets-Sheet 1
FIG. 1
FIG. 2
FIG. 3
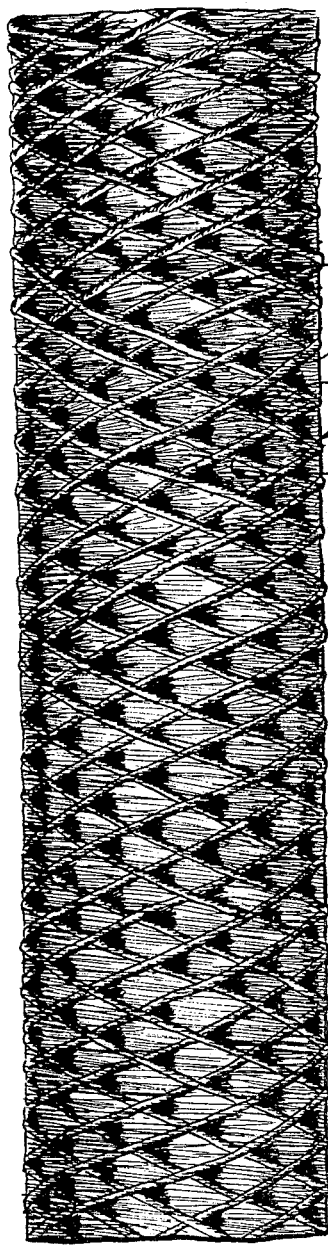
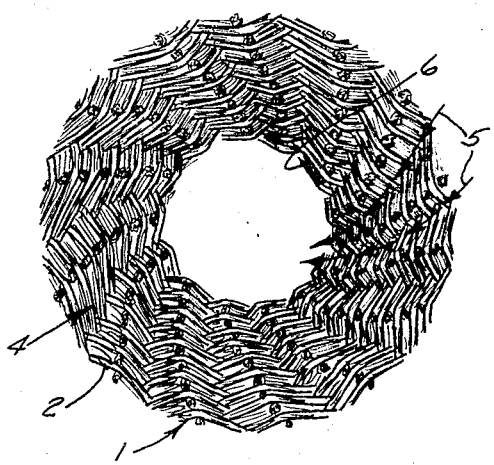
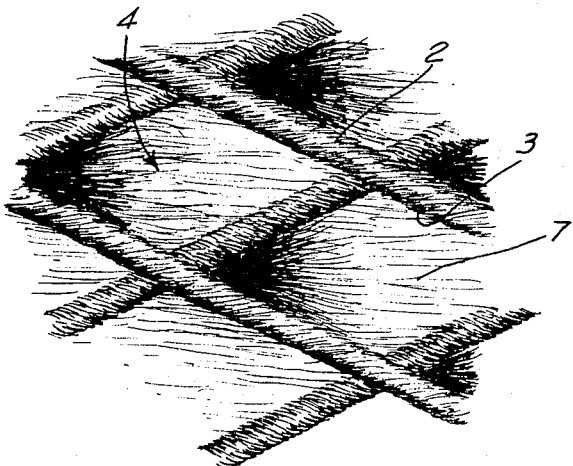
INVENTOR.
EDWARD R. ADAMS
JIM L. SHEPHARD
BY  ATTORNEYS

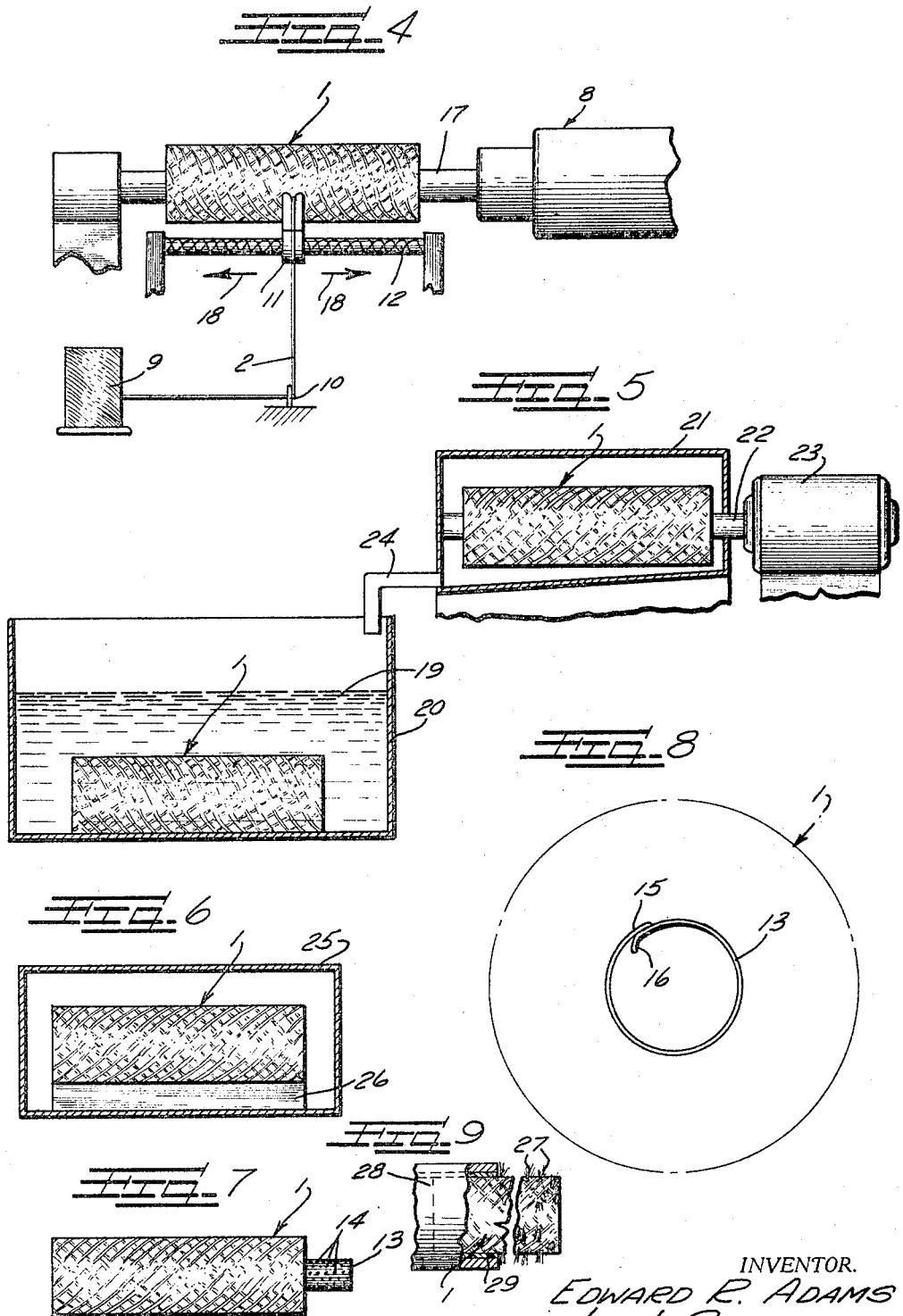

United States Patent Office 3,399,092
Patented Aug. 27, 1968

3,399,092
PROCESS OF MAKING IMPREGNATED
FILTER TUBES
Edward R. Adams and Jim L. Shepherd, Lebanon, Ind., assignors to Commercial Filters Corporation, Lebanon, Ind., a corporation of New York
Filed Dec. 17, 1964, Ser. No. 419,105
3 Claims. (Cl. 156—74)

ABSTRACT OF THE DISCLOSURE

A method of making a filter element comprising winding a napped fibrous textile yarn in crisscross style on a removable mandrel in successive overlapping layers to form a porous filter tube having diamond shaped openings between the layers, saturating the tube in a solution containing a bonding agent, spinning the saturated tube to remove excess solution, drying the tube and curing the bonding agent, and removing the mandrel. To smooth down any fibers misplaced by the spinning action the filter tube may be passed through a sizing tube.

---

This invention relates to improvements in a process of making impregnated filter tubes, and more particularly to a process for making a filter tube comprising helically wound layers of fibrous or fuzzy yarn, such as the filter tubes known in the trade as honeycomb filter tubes, and impregnating the tubes with a bonding agent, although the method may have other uses and purposes as will be apparent to one skilled in the art.

Heretofore honeycomb type filter tubes have been made by winding the tube in honeycomb style from a roving or fuzzy yarn without any impregnation with the bonding agent, and such tubes required the objectionably expensive usage of a relatively rigid perforated center or core tube to render the filter tube stable against collapse under the differential in pressure occurring between the pressure on the fluid being filtered on the upstream side of the element and the pressure on the filtrate leaving the downstream side of the element. Such a formerly known filter element, however, was subject to compression of the filter tube itself, particularly in the filtering of fluids having relatively high viscosity because of the great pressure differential, and thus the contaminant capacity of the filter tube was reduced.

The instant method results in the economic production of a honeycomb wound filter tube reinforced and strengthened by a suitable bonding agent possessing a number of distinct advantages over honeycomb filter tubes previously made. One of these advantages is the provision of a strong filter tube requiring no form of center or core tube therein which is a significant economical advancement in view of the fact that a variety of center tubes of different materials were required, in order to insure a center tube in a filter element that would be inert with respect to the material being filtered and would not adversely affect the material being filtered. Consequently, the center tubes had to be made in materials that would not adversely affect beverages, and would not adversely be affected by chemicals, acids and the like. The use of such tubes was a material item of expense in the manufacture of a filter element.

The filter element resulting from the practice of the instant method possesses many other advantages over a filter element of the same general character as made heretofore, among which may be mentioned the fact that the filter element is strengthened against compression by the differential pressure caused when a viscous fluid is passed through the element, thereby increasing the contaminant holding capacity of the element; the element also has a greater capacity for contaminants when low viscosity fluids are passed through because it effectively resists compression caused by increase in pressure differential resulting from the gradual building up of contaminants within the element; the element effectively resists collapse without a core or center tube under heavy pressures and can be used under higher pressure than previous honeycomb filter elements and so has far more filtration applications; the individual fibers resulting from napping of the yarn of which the element is wound are maintained in position against migration during filtration and remain over the passages through the filter element; the treatment of the element with the reinforcing bonding agent renders the element more effective in repelling entrained oil or water in a gas stream since it renders the filter material non-absorbent and hydrophobic; and the filter element or tube effectively resists the unloading of contaminant often associated with an alternating on-off filtration operation, which may occur during the filtration of engine fuel.

Consequently, it is an important object of the instant invention to provide an economic method of making a filter element possessing all of the above stated advantages.

A further object of this invention is the provision of a method of making an impregnated filter element involving quick and economic recovery of a large proportion of excess impregnant and solvent, thus materially reducing the time and cost associated with drying and solvent recovery.

It is also an object of this invention to provide a method of making an impregnated filter element whereby by far the greater percentage of excess solvent and impregnant is recovered in the same state it was when the cartridge was initially saturated, whereby such excess material is ready for immediate usage again.

Still a further object of this invention is the provision of a method of making an impregnated wound filter element, wherein the element is wound upon a temporary removable mandrel, and the mandrel is easily removed from the element during practice of the method.

The practice of the instant invention also insures thorough impregnation of the filter element.

Another advantage of this invention is the use of centrifugal force, after saturation of a filter element in an impregnant solution or dispersion, to exercise a control over the amount of solids from the impregnant solution or dispersion that remains in the finished filter element.

While some of the more salient features, characteristics and advantages of the instant invention have been above pointed out, others will become apparent from the following disclosures, taken in conjunction with the accompanying drawings, in which:

FIGURE 1 is a side elevational view of a filter tube or element resulting from the practice of the instant method;

FIGURE 2 is an enlarged transverse plan sectional view of the element of FIGURE 1;

FIGURE 3 is a fragmentary magnified view showing a portion of the surface of the element;

FIGURE 4 is a fragmentary diagrammatic view illustrating an initial step in the practice of the method;

FIGURE 5 is a fragmentary part sectional part elevational view, diagrammatic in character, and illustrating further steps in the manufacture of the filter tube;

FIGURE 6 is a fragmentary part sectional part elevational view illustrating a more advanced step in the making of the filter tube;

FIGURE 7 is a fragmentary view illustrating the final step in the making of the filter tube;

FIGURE 8 is a diagrammatic end view of the filter cartridge prior to the removal of the temporary mandrel; and FIGURE 9 is a fragmentary part sectional part side elevational view illustrating another method step which is desirable particularly with respect to the making of an impregnated filter cartridge in the lower density range.

As shown on the drawings:

The product derived from the practice of the instant method is illustrated in FIGURES 1, 2 and 3. The product is a filter cartridge in the form of a porous tubular element, generally indicated by numeral 1, and which consists entirely of a fibrous yarn or roving wound in successive layers of spaced helical convolutions. The winding of each subsequent layer is in the reverse direction to the winding of the previous layer, whereby a crisscrossed honeycomb pattern results. The specific winding of the yarn in this fashion is more fully set forth and described in Maurice A. Goldman U.S. Letters Patent No. 1,958,268 issued May 8, 1934.

In the winding of the tubular element, a fuzzy or fibrous yarn 2 is utilized, and this yarn to be referred to generically as textile may be of cotton fibers, viscous rayon, cellulose acetate, or other synthetic fiber, the yarn resembling a rove. The crisscross winding of the yarn provides rhombic or diamond-shaped openings 3 between successive layers and during the winding the strands of subsequent layers should be placed substantially uniformly over the strands of previous layers, but the crossing points of the strands are preferably moved slightly as to circumferential position on the tubular medium as it builds up. This causes the openings 3 in the successive layers to form curvate tunnels or passages, generally indicated by numeral 4, in the tubular filter body, and the fluid being filtered passes generally radially through the tubular element following the passages as indicated by the arrows 5 in FIGURE 2. In a filter element substantially 10 inches long, 2½ inches in diameter, with an unrestricted passage 6 lengthwise therethrough of approximately 1 inch in diameter, there may be 300 or more of such passages 4.

Before or during the winding of the yarn 2, this yarn is napped by any suitable napping mechanism, to provide fine fibers 7 extending across the passages 4, there being a myriad of these fibers extending across each passage. The fine fibers 7 occlude the passages in a manner to establish adequate filtering. The entire tubular element 1 is uniformly impregnated throughout with a suitable bonding agent and this impregnation will be more fully described later herein. Of course the impregnation with the bonding agent is effected in a manner not adversely affecting the void volume of the filter element 1.

With reference now to FIGURES 4 to 8 inclusive, it will be seen that the method of making the instant filter tube 1 includes the steps of winding the yarn into the element on a conventional winding machine generally indicated by numeral 8. In the general operation of this machine the yarn 2 is taken from a supply spool 9, fed through one or more guide loops 10 to acquire proper tensioning, and then into a movable yarn or roving guide 11 which is reciprocated back and forth as by a level wind screw 12 of the character commonly known in fishing reels and other level winding apparatus, for example. During its passage toward the element being formed, the yarn is napped by conventional napping mechanism to provide the aforesaid fibers 7 overlying the passages in the resultant filter element.

To expedite the formation of the filter element, the element is wound upon a temporary removable mandrel which is removed from the impregnated filter element as a final step of the method. Any suitable form of removable mandrel may be utilized for this purpose, and by way of an example an expansible and contractible mandrel 13 is shown in FIGURES 7 and 8. This mandrel is preferably made of spring steel and tends to expand to the position seen in FIGURE 8. The mandrel is preferably provided with numerous perforations 14 as seen in FIGURE 7 so that the yarn will properly engage the mandrel to insure an even and uniform winding of the yarn throughout the length of the resultant element. As seen in FIGURE 8 the mandrel 13 is of the split type and has overlapping end margins as indicated at 15. The inner of these margins is provided with an inwardly extending flange 16 for engagement by an instrument when it is desired to collapse the mandrel.

During the winding operation, the mandrel is carried on a shaft 17 of the machine 8 and rotated thereon while the roving guide 11 moves backward and forward along the screw 12 as indicated by the arrows 18—18 in FIGURE 4.

As stated above, the filter element 1 is impregnated throughout with a suitable bonding agent. Such impregnation might be made by applying the impregnant to the fiber prior to any manufacturing operations, applying it to the yarn or roving during the winding cycle, or by applying it to the finished filter element after winding. It is feasible to perform any of these impregnant applying operations, but the impregnated yarn or filter element would be more difficult to handle by way of the first two of the aforesaid operations. Accordingly, the preferred method is to apply the impregnant to the fully wound filter element after the winding operation has been completed.

To that end, when the element has reached the desired thickness, it is removed from the machine 8 and still containing the temporary mandrel 13 therein, the element is immersed in a bath 19 of impregnating solution contained in a tank or the like 20. The solution 19 may be a resin solution embodying a solvent or dispersion of controlled resin concentration. Consequently the terms "solution" and "solvent" are herein utilized in their broad sense, the term "solution" signifying a liquid impregnation bath, regardless of the strictly chemical nature of the liquid itself. The solution 19 preferably embodies a thermosetting bonding agent and to that end a solution containing phenol-formaldehyde resin, urea-formaldehyde resin, melamine resin, or numerous other satisfactory thermosetting agents known to the trade and those skilled in the art. In some instances, a thermoplastic bonding agent might be utilized if it can withstand high temperatures.

Immersing the filter element in the solution 19 results in the element picking up substantially 200% of its own weight of solution, which, of course, is more than necessary for adequate impregnation. In accord with prudent economical production, it is desired to salvage the excess solvent and bonding agent and to do that in as economical a manner as possible.

Accordingly, in the instant method, the saturated tube 1 is placed within a housing 21 on the shaft 22 of a motor 23, and the unit is spun or revolved at high speed by the motor, in excess of 3000 revolutions per minute for example, to drive out the excess solution by centrifugal force. The solution remains within the housing 21 and flows through an outlet tube 24 back in to the original solvent bath in the same condition as it was when it left that bath, so that it can be immediately reused.

The removal of the excess solution by centrifugal force effects an immediate recovery of solution embodying both the solvent and the bonding agent to such an extent that what solvent remains in the filter tube might economically be lost through subsequent evaporation. Also, the use of centrifugal force by virtue of spinning the saturated tube insures thorough impregnation of the tube. The resultant filter tube contains impregnant amounting to approximately 30% by weight of the weight of the yarn making up the filter tube.

Subsequently to the centrifuging operation, the impregnated filter tube still containing the temporary mandrel is placed in an oven diagrammatically indicated at 25 in FIGURE 6, and supported therein by any suitable means as diagrammatically indicated at 26. In this oven the bonding agent is set and cured, and if solvent remains in the impregnating solution, it is evaporated out, and if that solution contains a thermosetting resin, that resin is polymerized in the combined drying and curing operation. Following this operation, the completed filter is removed from the oven, and with the aid of a suitable instrument, the flange 16 of the temporary mandrel is grasped and the mandrel is collapsed by turning the flange 16 counterclockwise as seen in FIGURE 8, and the collapsed mandrel is removed from the filter element to be reused again in the making of another element.

In the case of filters in the low density range the convolutions of roving may not be sufficient to hold down some of the napped fibers 7 in the outer few layers of the winding of the wet filter element against the action of the centrifugal force. In certain cases, a few of these fibers may be carried outwardly by centrifugal force as indicated at 27 in FIGURE 9. Therefore, before the filter tube is placed in the oven 25 these misplaced fibers 27 should be smoothed down to give the filter a smooth external appearance when completed. This can be occomplished to a reasonably satisfactory extent by rolling the filter over a smooth surface. A simpler way of laying down the misplaced fibers, however, is to push the filter element or tube through a sizing tube 28 lined with polytetrafluoroethylene, or equivalent material which will dispose the misplaced fibers flatly adjacent the surface of the filter tube. Of course, there is a reasonably intimate fit between the filter tube and the lining 29 of the sizing tube 28. By virtue of the impregnant material still in the filter tube, the straightened fibers will remain in proper position during the heat treatment in the oven 25.

It should also be noted that the spinning of the saturated filter tube provides an easy way of acquiring the desired percentage of solids from the impregnant solution or dispersion in the resultant finished filter. For example, if the filter tube picks up 200% of the weight of the yarn of the impregnant solution or dispersion and a 10% solids content is desired in the resultant filter, a solution or dispersion containing a 5% content of the thermosetting material could be readily utilized, and 10% of that material would remain in the filter tube after removal of the excess impregnant and solvent. However, that procedure cannot be followed with a melamine resin-water dispersion, because a melamine-water dispersion containing 5% melamine resin cannot be had. There must be a higher melamine resin content to establish such a dispersion.

However, with the instant invention a melamine resin-water dispersion containing 25% melamine resin can be used, the filter tube saturated in the bath 19, to pick up 200% of the yarn weight of dispersion, and then when the element is placed in the spinning housing 21, it can be spun at the proper speed to reduce the dispersion content to 40% of the yarn weight. When the remaining water is removed from the 40% dispersion retained in the filter tube, a 10% melamine resin content will result. Thus, it can be seen that the spinning step in the instant invention not only permits the use of a wider range of materials, but may also be used to control the amount of thermosetting solids remaining in the completed filter tube.

Following this method procedure with or without its variant steps as the case may be, the completed filter unit is mechanically unsupported, the necessity of a center tube having been eliminated, which is an extremely important economical advance in the art. The unsupported filter unit is rigidified and strengthened against compression even by an extremely high differential pressure between the intake and outlet sides of the filter during filtration, and the filter is capable of adequately filtering fluids of high viscosities. The strength given the filter unit is solely through the bonding agent with which it is impregnated, and a filter unit results that is extremely economical and capable of performing the advantages listed hereinabove.

The method in itself is also extremely economical and rapid in performance, and the steps of utilizing a temporary mandrel with its ultimate simple removal, and the recovery of the major portion of the excess solvent and bonding agent in the same condition it was when the filter was initially saturated, and the immediate return of the recovered solution for reuse adds greatly to the economy of the method.

It will be understood that modifications and variations may be effected without departing from the scope of the novel concepts of the present invention.

We claim as our invention:

1. A method of making a filter element including the steps of:
   winding napped textile fibrous yarn in crisscross style on a removable mandrel in successive overlapping layers to form a porous filter tube having diamond shaped openings between said layers;
   saturating the tube in a solution containing bonding agent;
   spinning the saturated tube to remove excess solution;
   drying the tube and curing the bonding agent; and
   removing the mandrel.

2. A method according to claim 1 in which said bonding agent is a synthetic thermosetting resin, and heating the tube to set the resin.

3. A method of making a filter element including the steps of:
   winding a napped textile fibrous yarn in honeycomb style on a removable mandrel in successive layers to form a porous filter tube,
   saturating said tube with a solution containing a bonding agent,
   spinning the saturated tube to remove excess solution by centrifugal force,
   passing said tube through a sizing tube to smooth down any fibers misplaced by the spinning action,
   drying the sized tube and curing the bonding agent therein, and
   removing the mandrel.

References Cited

UNITED STATES PATENTS

| | | | |
|---|---|---|---|
| 2,331,146 | 10/1943 | Slayter | 156—74 XR |
| 1,958,268 | 5/1934 | Goldman | 210—457 |
| 2,607,494 | 8/1952 | Valente et al. | 210—508 XR |
| 2,614,058 | 10/1952 | Francis | 156—74 XR |
| 3,312,568 | 4/1967 | Coker et al. | 117—102 XR |

FOREIGN PATENTS 597,406    1/1948    Great Britain.

EARL M. BERGERT, *Primary Examiner.*

PHILIP DIER, *Assistant Examiner.*